(12) United States Patent
Hung et al.

(10) Patent No.: US 9,531,218 B2
(45) Date of Patent: Dec. 27, 2016

(54) MAGNETIC FORCE GENERATING DEVICE AND COLLISION PREVENTION SYSTEM INCLUDING THE SAME

(71) Applicant: National Taiwan Normal University, Taipei (TW)

(72) Inventors: Yi-Hsuan Hung, Taipei (TW); Chien-Hsun Wu, Taipei (TW); Yu-Xuan Lin, Yilan (TW); Jian-Hao Chen, Wujie Township (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 478 days.

(21) Appl. No.: 14/278,701

(22) Filed: May 15, 2014

(65) Prior Publication Data

US 2015/0180283 A1    Jun. 25, 2015

(30) Foreign Application Priority Data

Dec. 25, 2013    (TW) .............................. 102148265 A

(51) Int. Cl.
*H02J 17/00* (2006.01)
*E01F 15/02* (2006.01)
*G08G 1/16* (2006.01)

(52) U.S. Cl.
CPC .............. *H02J 17/00* (2013.01); *E01F 15/02* (2013.01); *G08G 1/162* (2013.01); *G08G 1/165* (2013.01); *G08G 1/166* (2013.01)

(58) Field of Classification Search
CPC ........... H02J 17/00; E01F 15/02; G08G 1/162; G08G 1/166; G08G 1/165
USPC ........................................................ 307/9.1
See application file for complete search history.

(56) References Cited

U.S. PATENT DOCUMENTS 6,565,147 B1 * 5/2003 Beals, Jr. ................ B60R 19/42
114/219

FOREIGN PATENT DOCUMENTS

| CN | 201257943 Y | 6/2009 |
|---|---|---|
| CN | 202847615 U | 4/2013 |
| CN | 103332180 A | 10/2013 |

\* cited by examiner

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

A magnetic force generating device is provided for application to a first object that is movable relative to a second object providing a first magnetic force, and includes a coil disposed on the first object, a sensing module disposed on the first object adjacent to the coil for sensing a distance between the first and second objects, and a processor. When the sensed distance is shorter than a threshold value, the processor enables provision to the coil of a driving current having a magnitude negatively correlated to the sensed distance, so that the coil generates a second magnetic force, which is repulsive to the first magnetic force, in response to the driving current.

8 Claims, 4 Drawing Sheets

MAGNETIC FORCE GENERATING DEVICE AND COLLISION PREVENTION SYSTEM INCLUDING THE SAME

CROSS-REFERENCE TO RELATED APPLICATION

This application claims priority to Taiwanese Application No. 102148265, filed on Dec. 25, 2013.

BACKGROUND OF THE INVENTION

1. Field of the Invention

The invention relates to a collision prevention system, and more particularly to a collision prevention system that includes a magnetic force generating device to automatically generate magnetic force for prevention of collision.

2. Description of the Related Art

In the automobile industry, active collision prevention techniques have been developed to detect surrounding conditions of a vehicle, to thereby actively protect a driver and passengers from accident. For example, collision prevention systems in some vehicles are configured to automatically decelerate the vehicle when a front car is in a detection range of a sensor of the vehicle, so as to maintain a safe distance from the front car, and to return back to a preset speed when the front car is out of the detection range. Another conventional obstacle avoidance system uses automatic steering and braking to avoid obstacles, such as a front car that suddenly stops or suddenly decelerates. Yet another conventional system automatically controls the brake and the accelerator when a possibility of collision is detected.

However, the applicant is unaware of a system designed to prevent collision with an object on a side of the vehicle, such as a safety guard or a neighboring vehicle.

SUMMARY OF THE INVENTION

Therefore, an object of the present invention is to provide a magnetic force generating device that uses repulsive magnetic forces to prevent collision with a nearby object.

According to one aspect of the present invention, a magnetic force generating device is provided for application to a first object that is movable relative to a second object. The second object provides a first magnetic force, and the magnetic force generating device comprises:

a controllable power source;

a coil to be disposed on the first object, and configured to receive electrical power from the controllable power source;

a sensing module to be disposed on the first object adjacent to the coil, and configured to sense a distance between the first object and the second object;

a switch module configured to make or break electrical connection between the controllable power source and the coil; and a processor coupled to the controllable power source, the sensing module and the switch module.

When the distance sensed by the sensing module is shorter than a threshold value, the processor is configured to control the controllable power source to generate a driving current having a magnitude negatively correlated to the distance sensed by the sensing module, and to control the switch module to make electrical connection so that the driving current generated by the controllable power source is provided to the coil. The coil generates a second magnetic force in response to the driving current, and the second magnetic force is repulsive to the first magnetic force.

Another object of the present invention is to provide a collision prevention system including the magnetic force generating device of this invention.

According to another aspect of the present invention, a collision prevention system is provided for application to a first object and a second object, at least one of which is movable relative to the other. The collision prevention system comprises:

a magnetic module to be disposed on the second object, and configured to generate a first magnetic force with a predetermined polarity; and a magnetic force generating device including:

a controllable power source;

a coil to be disposed on the first object, and configured to receive electrical power from the controllable power source;

a sensing module to be disposed on the first object adjacent to the coil, and configured to sense a distance between the first object and the second object;

a switch module configured to make or break electrical connection between the controllable power source and the coil; and a processor coupled to the controllable power source, the sensing module and the switch module.

When the distance sensed by the sensing module is shorter than a threshold value, the processor is configured to control the controllable power source to generate a driving current having a magnitude negatively correlated to the distance sensed by the sensing module, and to control the switch module to make electrical connection so that the driving current generated by the controllable power source is provided to the coil. The coil generates a second magnetic force in response to the driving current. The second magnetic force has the predetermined polarity and is repulsive to the first magnetic force.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
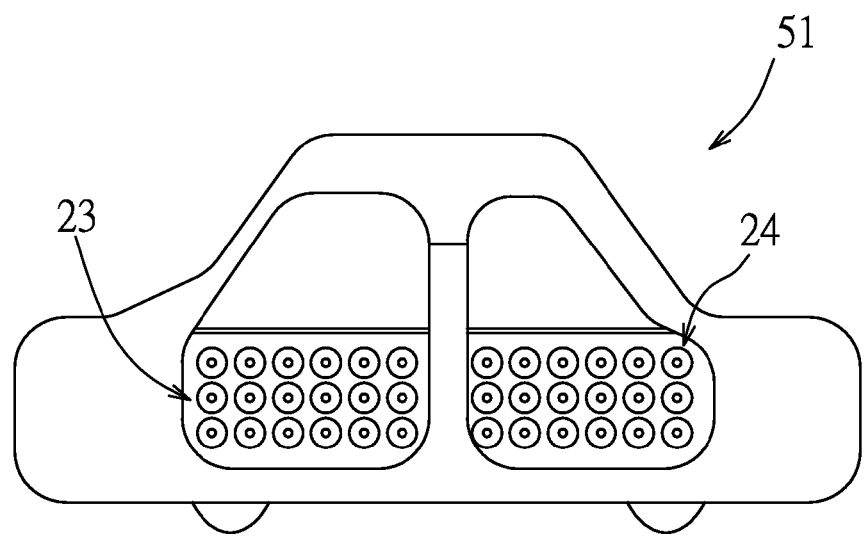
FIG. 1 is a schematic diagram illustrating a preferred embodiment of the collision prevention system according to the present invention that includes a plurality of coils disposed on a car.
Figure 2:
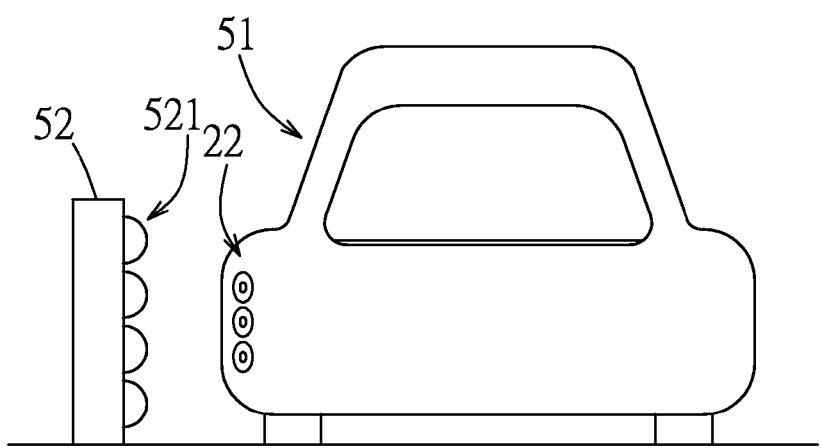
FIG. 2 is a schematic diagram illustrating that the preferred embodiment also includes a plurality of coils disposed on a safety guard.

Referring to FIGS. 1 and 2, the preferred embodiment of the collision prevention system according to this invention is applied to a first object 51 and a second object 52, one of which is movable relative to the other. In this embodiment, the first object 51 is a car, and the second object 52 is a safety guard.

Figure 3:
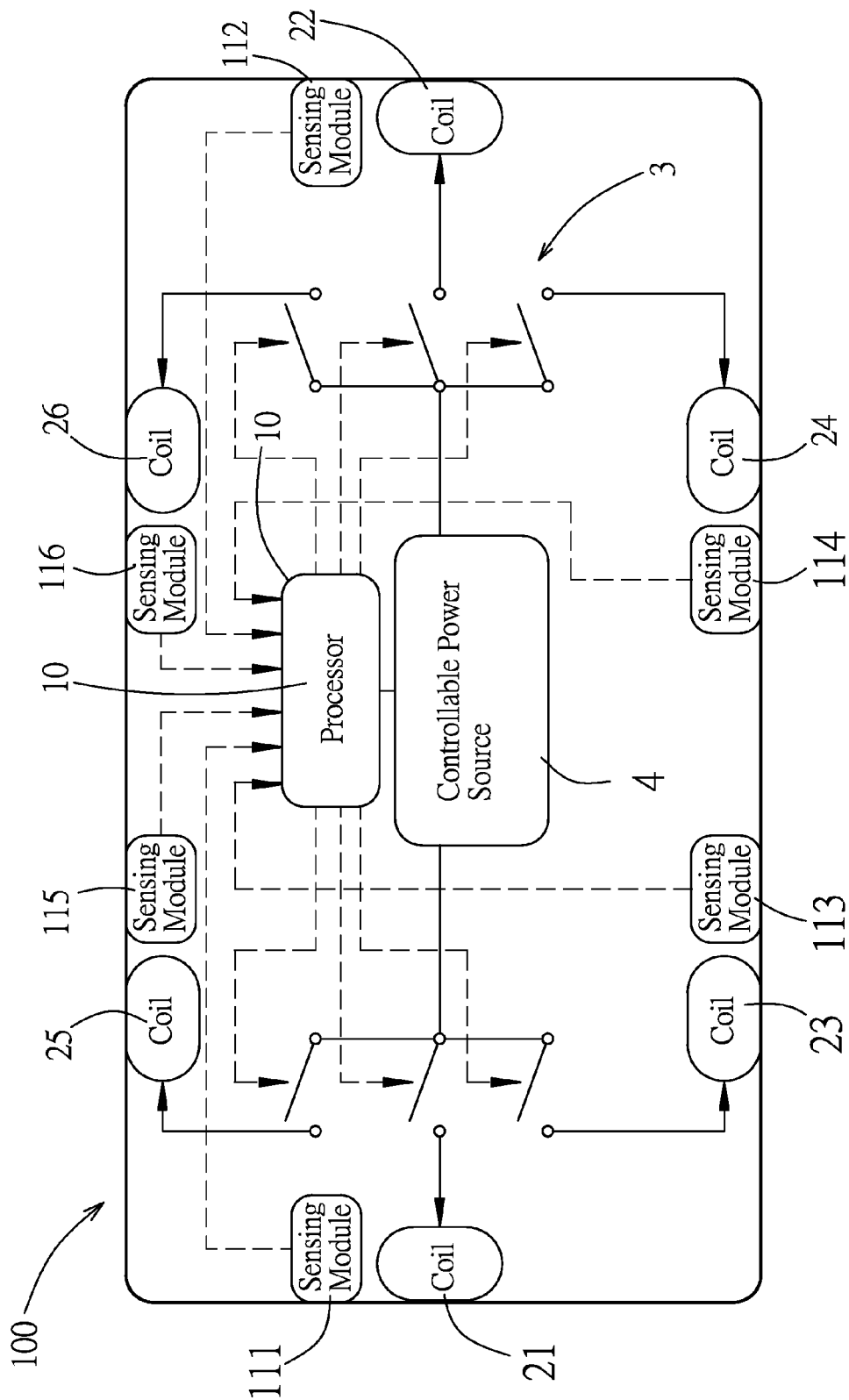
FIG. 3 is a block diagram illustrating a magnetic force generating device of the preferred embodiment.

Further referring to FIG. 3, the collision prevention system includes a magnetic force generating device 100 to be installed to the first object 51, and a magnetic module 521 to be disposed on the second object 52, such as a permanent magnet that generates a first magnetic force with a predetermined polarity. The magnetic force generating device 100 includes a processor 10, a plurality of sensing modules 111 to 116, a plurality of coils 21 to 26, a switch module 3 and a controllable power source 4.

Each of the coils 21 to 26 is disposed on the first object 51, and each of the sensing modules 111 to 116 is disposed on the first object 51 adjacent to a respective one of the coils 21-26. The coils 21 to 26 and the sensing modules 111 to 116 may be installed at a front portion, a rear portion, a front-left portion, a rear-left portion, a front-right portion or a rear-right portion of the first object 51 (i.e., the car). Each of the sensing modules 111 to 116 is a device configured to sense a distance between the first object 51 and the second object 52 in a vicinity of the first object 51, such as a laser distance meter or an infrared distance meter. It should be noted that, in the application to the car and the safety guard, if protection to the car is only required at the safety-guard side, similar protection effect may be achieved by installing only one set of the coil and the sensing module on the car, and multiple sets of the coil and the sensing module may not be necessary.

The switch module 3 is coupled between the controllable power source 4 and each of the coils 21 to 26, and is controlled by the processor 10 to make or break electrical connection between the controllable power source 4 and each of the coils 21 to 26.

The processor 10 is coupled to the controllable power source 4, the sensing modules 111 to 116 and the switch module 3. When the processor 10 determines the distance sensed by one of the sensing modules 111 to 116 is shorter than a threshold value (i.e., a safe distance), the processor 10 controls the controllable power source 4 to generate a driving current having a magnitude negatively correlated to the distance sensed by said one of the sensing modules 111 to 116, and to control the switch module 3 to make electrical connection between the controllable power source 4 and a corresponding one of the coils 21 to 26 that is adjacent to said one of the sensing modules 111 to 116, so that the driving current generated by the controllable power source 4 is provided to the corresponding one of the coils 21 to 26. In this embodiment, the magnitude of the driving current generated by the controllable power source 4 is controlled by the processor 10 to have the magnitude inversely proportional to the distance sensed by said one of the sensing modules 111 to 116. The corresponding one of the coils 21 to 26 is configured to generate a second magnetic force in response to the driving current received thereby, and the second magnetic force is repulsive to the first magnetic force. In such a design, when the sensed distance is shorter than the threshold value, a shorter sensed distance between the first and second objects 51, 52 induces a stronger magnetic field, thereby leading to a stronger repulsive force between the first and second objects 51, 52. On the other hand, when the distance between the first object 51 (e.g., the car) and the second object 52 (e.g., the safety guard, the neighboring car, etc.) is longer than the threshold value (i.e., the safe distance), the processor 10 controls the switch module 3 to break electrical connection between the controllable power source 4 and each of the coils 21 to 26, so that the coils 21 to 26 do not generate magnetic fields.

In this embodiment, the magnetic force generating device 100 is configured to satisfy the following equation:

$$F = \frac{2 \times (N \times I)^2 \times \mu \times A}{2g^2}$$

where F is a magnitude of the second magnetic force, N is a number of turns of the coil to which the driving current is provided, I is the magnitude of the driving current, μ is a magnetic constant, A is a cross-sectional area of the coil to which the driving current is provided, and g is the distance sensed by the corresponding one of the sensing modules 111 to 116. According to the above equation, the shorter distance g results in greater second magnetic force F since the shorter distance g also leads to greater driving current I, so that collision between the first and second objects 51, 52 may be effectively prevented.

Figure 4:
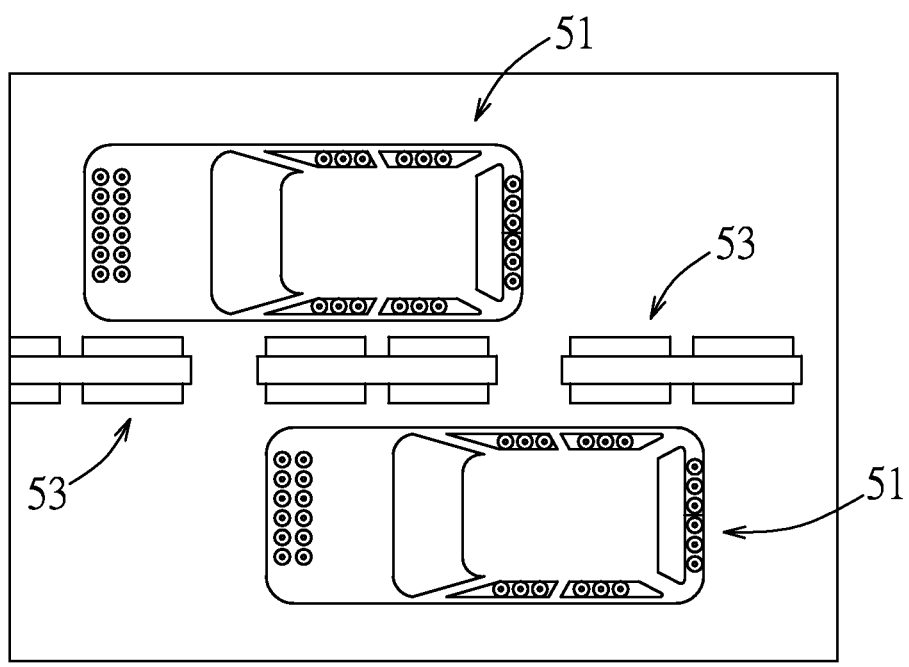
FIG. 4 is a schematic diagram illustrating a first exemplary application of the collision prevention system of this invention.

Referring to FIG. 4, in a first exemplary application, the collision prevention system of this invention is applied to a car 51 and a safety guard 53, each of which is installed with the magnetic force generating device 100 as illustrated in FIG. 3. When a sensed distance between the car 51 and the safety guard 53 is smaller than the threshold value, the magnetic force generating devices 100 installed on the car 51 and the safety guard 53 generate repulsive magnetic fields therebetween, so that a safe distance may be maintained between the car 51 and the safety guard 53, thereby preventing collision. In other applications, the magnetic force generating device 100 installed on the safety guard 53 may be replaced using permanent magnets as mentioned above.

Figure 5:
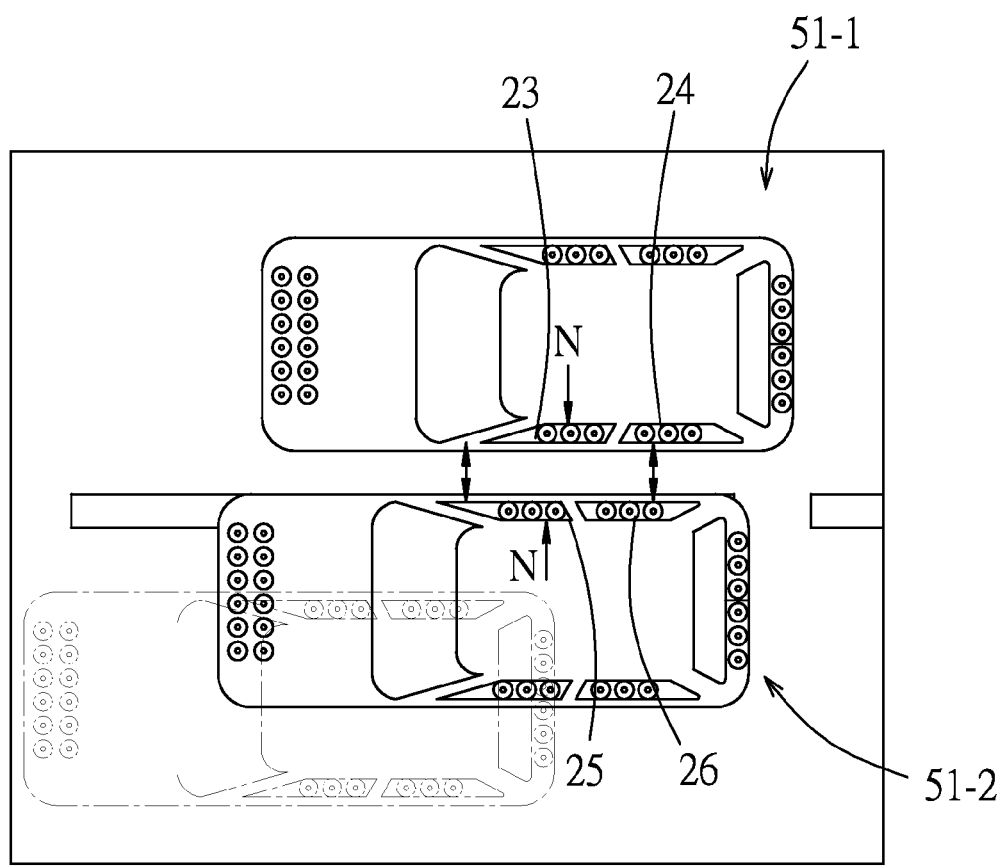
FIG. 5 is a schematic diagram illustrating a second exemplary application of the collision prevention system of this invention.

Referring to FIG. 5, in a second exemplary application, the collision prevention system of this invention is applied to a first car 51-1 and a second car 51-2, each of which is installed with the magnetic force generating device 100 as illustrated in FIG. 3. When a sensed distance between the first and second cars 51-1 and 51-2 is smaller than the threshold value, the magnetic force generating devices 100 installed on the first and second cars 51-1 and 51-2 generate repulsive magnetic fields therebetween (i.e., both having a magnetic polarity of a north pole or a south pole), so that a safe distance may be maintained between the cars 51-1 and 51-2, thereby preventing collision.

To sum up, the collision prevention system according to the present invention uses the processor 10 to control the controllable power source 4 and the switch module 3 to, upon determining that a distance between the first and second objects 51, 52 sensed by one of the sensing modules 111 to 116 is shorter than the threshold value, generate a driving current that is provided to a corresponding one of the coils 21 to 26, so as to generate repulsive magnetic forces between the first and second objects 51, 52 to thereby prevent collision with the second object 52, such as neighboring vehicles, safety guards, etc.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A magnetic force generating device for application to a first object that is movable relative to a second object, the second object providing a first magnetic force, said magnetic force generating device comprising:

a controllable power source;

a coil to be disposed on the first object, and configured to receive electrical power from said controllable power source;
a sensing module to be disposed on the first object adjacent to said coil, and configured to sense a distance between the first object and the second object;
a switch module configured to make or break electrical connection between said controllable power source and said coil; and
a processor coupled to said controllable power source, said sensing module and said switch module;
wherein, when the distance sensed by said sensing module is shorter than a threshold value, said processor is configured to control said controllable power source to generate a driving current having a magnitude negatively correlated to the distance sensed by said sensing module, and to control said switch module to make electrical connection so that the driving current generated by said controllable power source is provided to said coil, said coil generating a second magnetic force in response to the driving current, the second magnetic force being repulsive to the first magnetic force.

2. The magnetic force generating device as claimed in claim 1, wherein said coil is configured such that the second magnetic force generated thereby satisfies a relationship of:

$$F = \frac{2 \times (N \times I)^2 \times \mu \times A}{2g^2}$$

where F is a magnitude of the second magnetic force, N is a number of turns of said coil, I is the magnitude of the driving current, $\mu$ is a magnetic constant, A is a cross-sectional area of said coil, and g is the distance sensed by said sensing module.

3. The magnetic force generating device as claimed in claim 1, comprising a plurality of said coils to be separately disposed on the first object, and a plurality of said sensing modules to be disposed on the first object and respectively adjacent to said coils.

4. A collision prevention system for application to a first object and a second object, at least one of which is movable relative to the other, said collision prevention system comprising:
a magnetic module to be disposed on the second object, and configured to generate a first magnetic force with a predetermined polarity; and
a magnetic force generating device including:
a controllable power source;
a coil to be disposed on the first object, and configured to receive electrical power from said controllable power source;
a sensing module to be disposed on the first object adjacent to said coil, and configured to sense a distance between the first object and the second object;
a switch module configured to make or break electrical connection between said controllable power source and said coil; and
a processor coupled to said controllable power source, said sensing module and said switch module;
wherein, when the distance sensed by said sensing module is shorter than a threshold value, said processor is configured to control said controllable power source to generate a driving current having a magnitude negatively correlated to the distance sensed by said sensing module, and to control said switch module to make electrical connection so that the driving current generated by said controllable power source is provided to said coil, said coil generating a second magnetic force in response to the driving current, the second magnetic force having the predetermined polarity and being repulsive to the first magnetic force.

5. The collision prevention system as claimed in claim 4, wherein said coil is configured such that the second magnetic force generated thereby satisfies a relationship of:

$$F = \frac{2 \times (N \times I)^2 \times \mu \times A}{2g^2}$$

where F is a magnitude of the second magnetic force, N is a number of turns of said coil, I is the magnitude of the driving current, $\mu$ is a magnetic constant, A is a cross-sectional area of said coil, and g is the distance sensed by said sensing module.

6. The collision prevention system as claimed in claim 4, comprising a plurality of said coils to be separately disposed on the first object, and a plurality of said sensing modules to be disposed on the first object and respectively adjacent to said coils.

7. The collision prevention system as claimed in claim 4, wherein said magnetic module is a permanent magnet.

8. The collision prevention system as claimed in claim 4, wherein said magnetic module has the same configuration as that of said magnetic force generating device.

* * * * *